United States Patent
Lin et al.

(10) Patent No.: US 8,917,938 B2
(45) Date of Patent: Dec. 23, 2014

(54) METHOD FOR ESTIMATING BLUR DEGREE OF IMAGE AND METHOD FOR EVALUATING IMAGE QUALITY

(71) Applicant: National Chung Cheng University, Chiayi County (TW)

(72) Inventors: Huei-Yung Lin, Chiayi County (TW); Xin-Han Zhou, Kaohsiung (TW)

(73) Assignee: National Chung Cheng University, Chiayi County (TW)

( * ) Notice: Subject to any disclaimer, the term of this patent is extended or adjusted under 35 U.S.C. 154(b) by 153 days.

(21) Appl. No.: 13/684,324

(22) Filed: Nov. 23, 2012

(65) Prior Publication Data

US 2013/0308866 A1 Nov. 21, 2013

(30) Foreign Application Priority Data

May 15, 2012 (TW) .............................. 101117289 A

(51) Int. Cl.
G06K 9/46 (2006.01)
G06K 9/66 (2006.01)
G06T 7/00 (2006.01)

(52) U.S. Cl.
CPC ................ G06K 9/46 (2013.01); G06T 7/0002 (2013.01); G06T 2207/30168 (2013.01)
USPC .......................................... 382/195; 382/264

(58) Field of Classification Search
USPC .......................... 345/643, 647; 382/195, 254
See application file for complete search history.

(56) References Cited

U.S. PATENT DOCUMENTS

| 7,336,844 | B2 * | 2/2008 | Pike et al. ...................... 382/254 |
| 7,710,463 | B2 * | 5/2010 | Foote .......................... 348/218.1 |
| 7,990,429 | B2 * | 8/2011 | Saito .......................... 348/222.1 |
| 8,213,736 | B2 * | 7/2012 | Toyoda et al. ................ 382/264 |
| 8,395,642 | B2 * | 3/2013 | Yea et al. ...................... 345/647 |
| 2009/0109304 | A1 * | 4/2009 | Guan ....................... 348/240.99 |
| 2010/0123807 | A1 * | 5/2010 | Lee et al. ...................... 348/241 |
| 2010/0231748 | A1 * | 9/2010 | Takeda ........................ 348/229.1 |
| 2011/0249028 | A1 * | 10/2011 | Chang et al. .................. 345/643 |
| 2013/0308866 | A1 * | 11/2013 | Lin et al. ....................... 382/195 |

* cited by examiner

*Primary Examiner* — Gregory M Desire
(74) *Attorney, Agent, or Firm* — Muncy, Geissler, Olds & Lowe, P.C.

(57) ABSTRACT

A method for estimating blur degree of image and a method for evaluating image quality are revealed. First, an input image is transmitted to an image processing device for producing a synthesized blur image including a nonlinear image sensing function according to a pixel intensity distribution parameter of the input image. Next, the image processing device matches the pixel intensity distribution according to the input image and the synthesized blur image for producing a blur degree parameter; By the way, the image processing device further estimating an estimated blur result according to the blur degree parameter. The method for estimating blur degree of image can be further applied to estimate blur distribution for a plurality of regions of interest of a plurality of input images. Thereby, the blur distribution of the input images can be estimated, and thus further evaluating the image quality of the plurality of input images.

4 Claims, 8 Drawing Sheets

METHOD FOR ESTIMATING BLUR DEGREE OF IMAGE AND METHOD FOR EVALUATING IMAGE QUALITY

FIELD OF THE INVENTION

The present invention relates generally to an image operational method, and particularly to a method for estimating blur degree of image and a method for evaluating image quality.

BACKGROUND OF THE INVENTION

Image process can be distinguished into image pre-process and image post-process. People can use an image extraction device to shoot scenery for acquiring the digital image data thereof. The acquired image data is generally called raw data. The raw data further will be processed for generating specific image effects. The procedure of using an image extraction device to shoot and acquire raw data is named image pre-process; the image processing procedure afterwards is called image post-process. The pre-processing procedures include the controls during image extraction, for example, auto focus and auto exposure. On the other hand, the general image post-processing procedures include noise reduction on raw data, white balancing, color interpolation, color calibration, gamma correction, color space conversion, edge enhancement, saturation enhancement, and false color suppression for obtaining images of superior quality.

In addition, with the prevalence of the digital optical devices such as digital still cameras and digital video cameras, people's requests for the image quality become demanding increasingly. Nonetheless, many factors in digital optical devices, including imaging defects caused by optical design, errors in lens processing, nonlinear characteristics and noises in image sensors, affect the imaging quality. In particular, defocus in image sensors tends to produce image blur. Unfortunately, the post-processing method described above does not estimate the blur degree of image for blur images. Thereby, the blur situation of defocused blur image cannot be improved. For solving the defocus problem, a point spread function (PSF) is developed by researchers in the image processing field.

Generally speaking, a digital optical device can use a point spread function for representing an optical path or an imaging system, where each object distance has a corresponding PSF for representing the optical characteristics of the optical path at the object distance. Besides, the image extracted by an image sensor is the convolution of the target image and the PSF. Current PSF is a Gaussian PSF according to the Gaussian function, which is used for representing the optical imaging system of a linear sensing device. In other words, the Gaussian PSF is a point spread function in an ideal condition. Nonetheless, a digital optical imaging system is an image extracting system built on nonlinear sensing devices. Thereby, imaging based on Gaussian PSF cannot represent the real target image exactly.

Consequently, even in a focused condition, the scenery in focus cannot be imaged on the image sensor perfectly. For the objects at other object distances, the imaging quality deteriorates significantly owing to defocus. In a defocused image, there usually exist only minor differences among nearby pixels, making the image intensity uniformly distributed among a plurality of pixels after convolution between the target image and the PSF. Thereby, the image extracted by the image sensor is blur with uniform intensity. Currently, the Gaussian PSF is adopted as the main function for modifying blur in defocused blur images. Because the Gaussian PSF, which can only modify blur in a linear system, cannot build an imaging model of an optical system using nonlinear sensing devices and current image modification technologies cannot estimate the blur degree of image in a blur image with certainty, current image modification technologies cannot eliminate the image blur generated by defocus effectively.

Accordingly, the present invention provides an estimation method for blur degree of image and an evaluation method for image quality, which match the pixel intensity distribution by using a synthesized image related to a non-uniform image and the input image. Thereby, the estimation for blur is given, which can be further applied to evaluation of image quality.

SUMMARY

An objective of the present invention is to provide a method for estimating blur degree of image and a method for evaluating image quality, which provide a better blur estimation result in subsequent applications.

Another objective of the present invention is to provide a method for estimating blur degree of image and a method for evaluating image quality, which match pixel intensity distribution for enhancing blur estimation accuracy.

The present invention provides a method for estimating blur degree of image. First, an input image is transmitted to an image processing device. Then the image processing device produces a synthesized blur image with a nonlinear image sensing function according to a pixel intensity distribution parameter of the input image. Next, the image processing device matches the pixel intensity distribution according to the input image and the synthesized blur image for producing a blur degree parameter. Finally, the image processing device calculates and obtains a blur estimation result. Thereby, the blur degree of the input image is given.

The present invention provides a method for evaluating image quality. First, a plurality of input images is transmitted to an image processing device. Then, the image processing device gives a plurality of edge images according to a plurality of pixel intensity distribution parameters of the plurality of input images. Next, the image processing device selects a plurality of regions of interest according the plurality of edge images. Afterwards, the image processing device performs estimation of blur distribution on the plurality of regions of interest according to the method for estimating blur degree of image according to the present invention for acquiring a plurality of blur estimated results on the plurality of regions of interest. Finally, the image processing device evaluates the image quality of the plurality of input images according to the plurality of blur estimated results.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
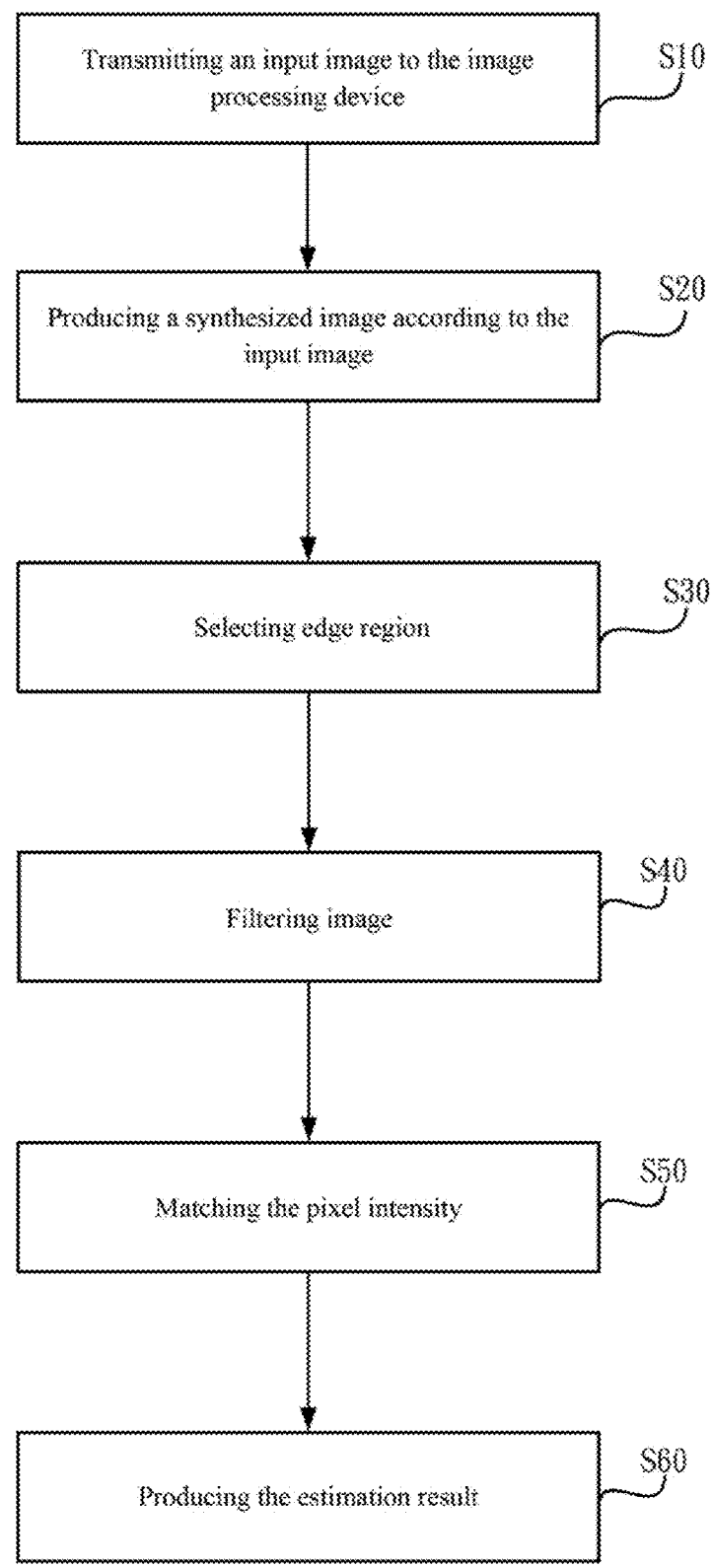
FIG. 1 shows a flowchart according to an embodiment of the present invention.

FIG. 1 shows a flowchart according to an embodiment of the present invention. As shown in the figure, the estimation method for blur degree of image according to the present invention is applied to an image processing device for estimating a defocused image and hence further understanding the blur distribution degree of the defocused image. The estimation method according to the present invention comprises steps of:

Step S10: Transmitting an input image;
Step S20: Producing a synthesized image according to the input image;
Step S30: Selecting at least an edge region;
Step S40: Filtering image;
Step S50: Matching the pixel intensity distribution; and
Step S60: Acquiring the estimation result in blur degree.

In the step S10, an image extracting device is used for extracting and transmitting an input image to an image processing device. The image extracting device according to the present embodiment is an image sensor of a camera system. The image sensor senses and transmits the input image to the image processing device, such as a central processing unit (CPU) or a graphic processing unit (GPU). The input image is a defocused blur image with an image function g(x,y). Besides, the image function of a focused image is f(x,y), which also represents the pixel intensity distribution of the focused image. Thereby, according to the relationship between the defocused blur image and the focused image and the convolution of the image functions, Equation (1) is given as follows:

$$g(x,y) = f(x,y) * h(x,y) + \xi(x,y) \quad (1)$$

where ξ(x,y) is an image function of image noise, which is normally present in images extracted using image sensors; h(x,y) is a PSF of the image sensor. According to the property of degeneracy in space invariance, the practical distribution characteristics of the PSF h(x,y) and the image function of image noise ξ(x,y) are equivalent to those of the image function of the focused image f(x,y). The PSF of a general image sensor is a nonlinear function.

In the step S20, the image processing device produces a corresponding synthesized blur image according to the pixel intensity distribution of the input image. The image processing device according to the present invention synthesizes the synthesized blur image according to the distribution parameters of two adjacent image regions of the distribution parameter of a blur image region. For example, a defocused, blur, and black-and-white input image is composed by pixels with different gray-scale brightness. The defocused and blur portion is the portion where the outline of an image is blur. In other words, instead of being arranged individually, brighter and darker pixels are mixed. The image processing device according to the present invention overlaps the brighter pixel distribution and the darker pixel distribution on both sides of the defocused and blur portion for synthesizing the synthesized blur image corresponding to the black-and-white input image. In addition, the image function g(x,y)' can also be expressed as Equation (1), where the PSF h(x,y)' is expressed as Equation (2) below:

$$h(x,y)' = \begin{cases} \frac{1}{(\pi\rho^2)}, & x^2 + y^2 \leq \rho^2 \\ 0, & x^2 + y^2 > \rho^2 \end{cases} \quad (2)$$

Figure 2:
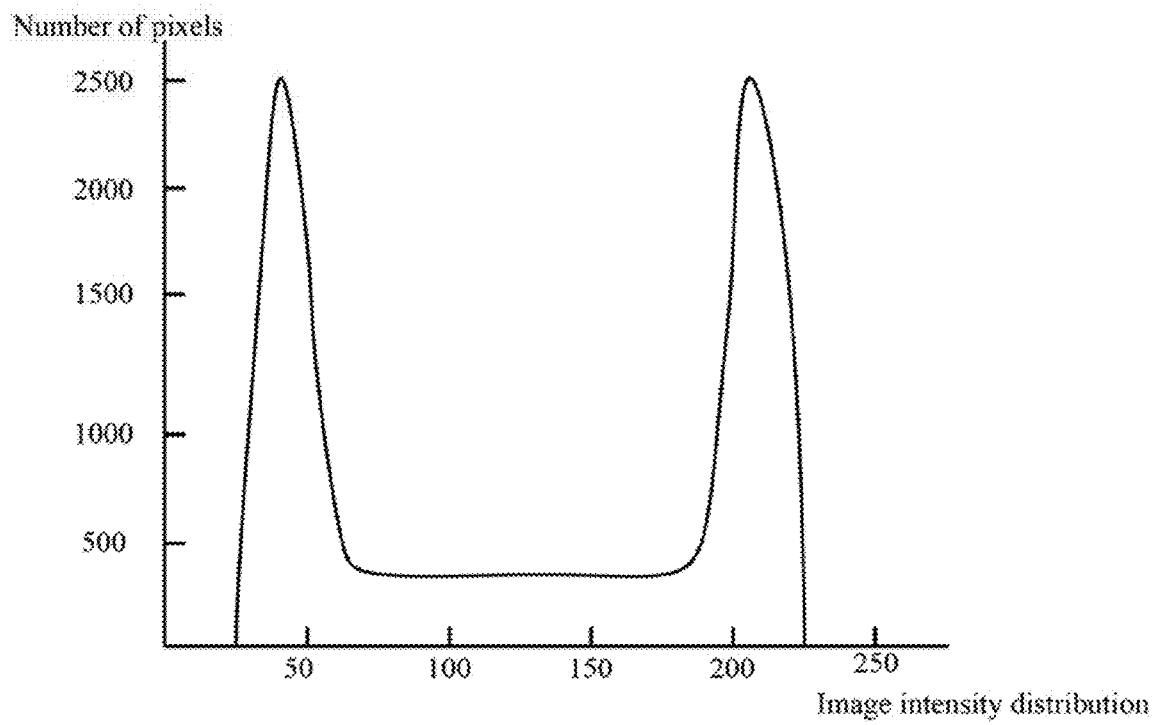
FIG. 2A shows the curve of pixel intensity distribution of a Gaussian synthesized image according to the prior art.
FIG. 2B shows the curve of pixel intensity distribution of an input image.
FIG. 2C shows the curve of pixel intensity distribution of a synthesized blur image according to the present invention.
Figure 2:
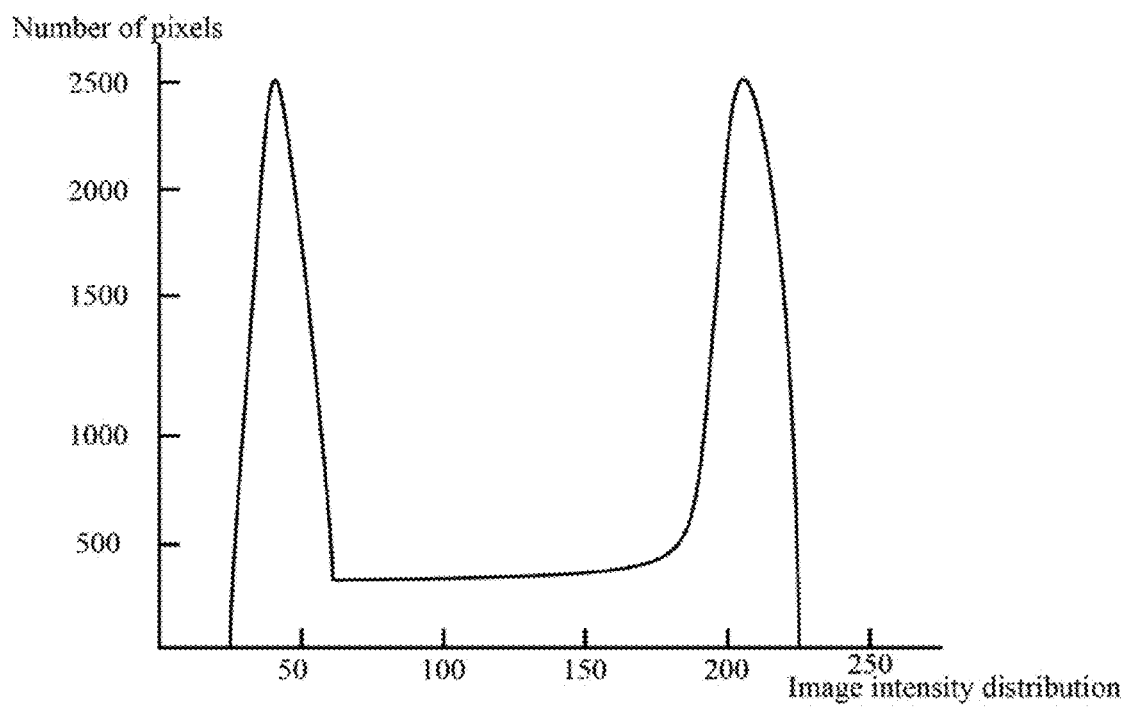
Figure 2:
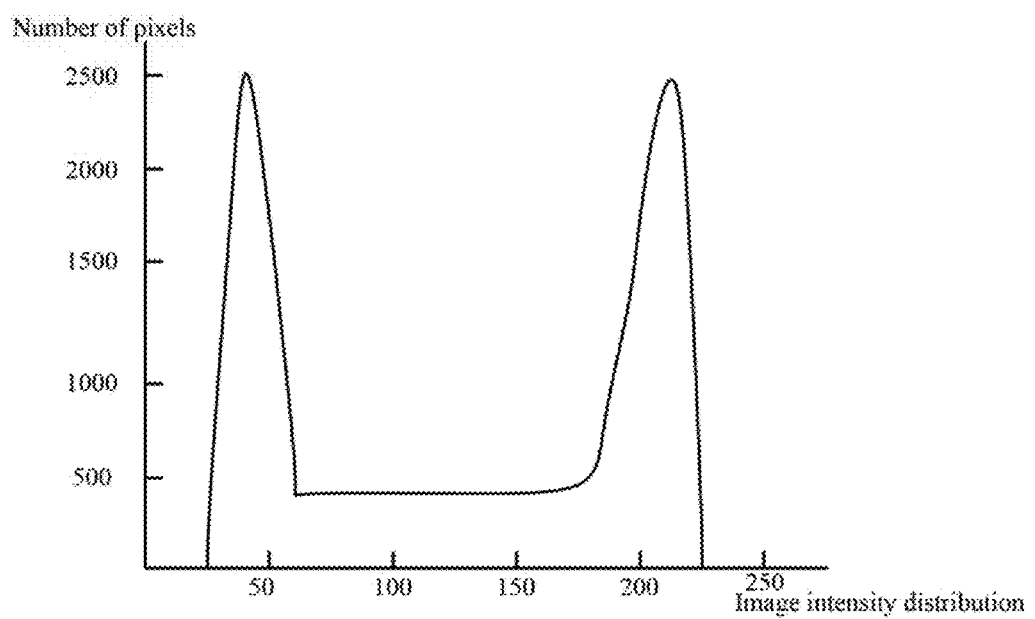

In Equation (2), ρ is an optical parameter, which is related to the aperture and the effective focal length. A convolution is provided by Equation (2) and nonlinear adjustment of image intensity values, for reaching that the synthesized blur image is made to approximate the practical blur image, for example, the input image. FIGS. 2A to 2C show histograms of a Gaussian synthesized image, an input image, and a synthesized blur image, respectively. The pixel intensity values of most pixels of a blur image are between 25 and 225. In FIG. 2A, the histogram of the pixel intensity distribution of the synthesized image according to the prior is shown. The Gaussian PSF adopted by general image recovery technology is used for forming a Gaussian synthesized image. Thereby, the pixel intensity distribution of the Gaussian synthesized image in FIG. 2A is relatively uniform. This is evident by taking the pixel intensity value 125 as the axis and the distribution exhibits symmetrical about the axis. FIG. 2B shows the histogram of the pixel intensity distribution of an input image extracted in practice. According to FIG. 2B, the pixel intensity distribution of the input image is not symmetrical. Because the Gaussian PSF is an ideal parameter, the pixel intensity distribution of the Gaussian synthesized image is uniform. Thereby, the Gaussian synthesized image generated by the image processing device according to the Gaussian PSF cannot approximate the pixel intensity distribution of the input image. FIG. 2C is related to the synthesized blur image generated by the image processing device according to the present embodiment. Because the synthesized image according to the present embodiment is influenced by the nonlinear image sensing function as well as the PSF, the distribution also exhibits nonsymmetrical. Hence, the pixel intensity distribution curve in FIG. 2C approximates that of the input image. Accordingly, the synthesized blur image according to the present invention is more suitable for matching pixel intensity distribution of the input image.

Figure 3:
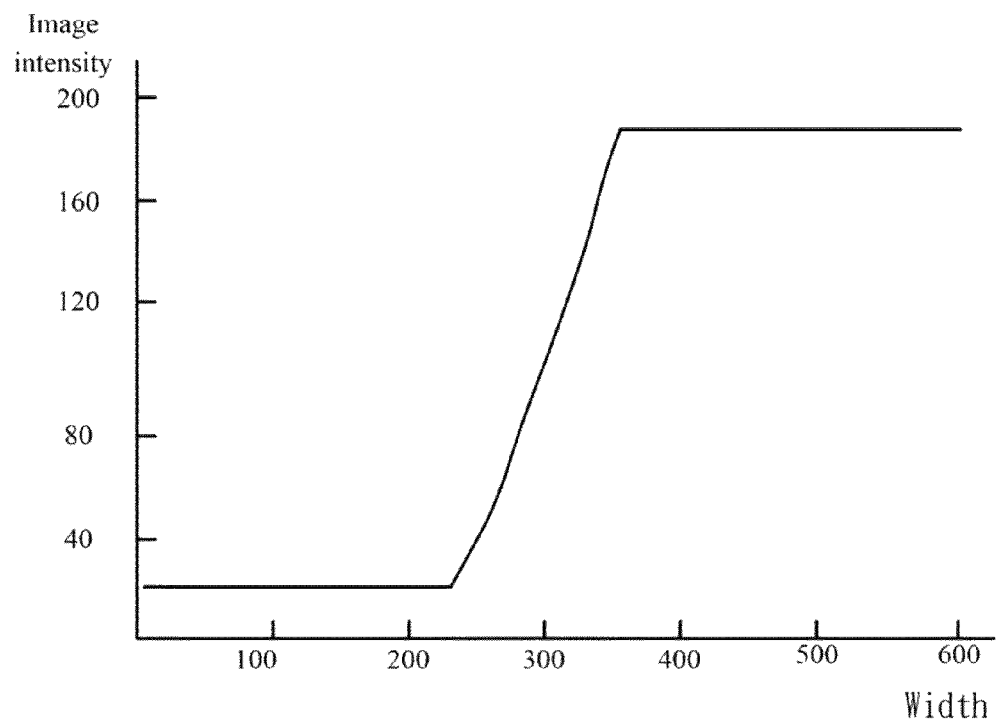
FIG. 3A shows the pixel intensity distribution along a line profile of a Gaussian synthesized image according to the prior art.
FIG. 3B shows the pixel intensity distribution along a line profile of an input image.
FIG. 3C shows the pixel intensity distribution along a line profile of a synthesized blur image according to the present invention.
Figure 3:
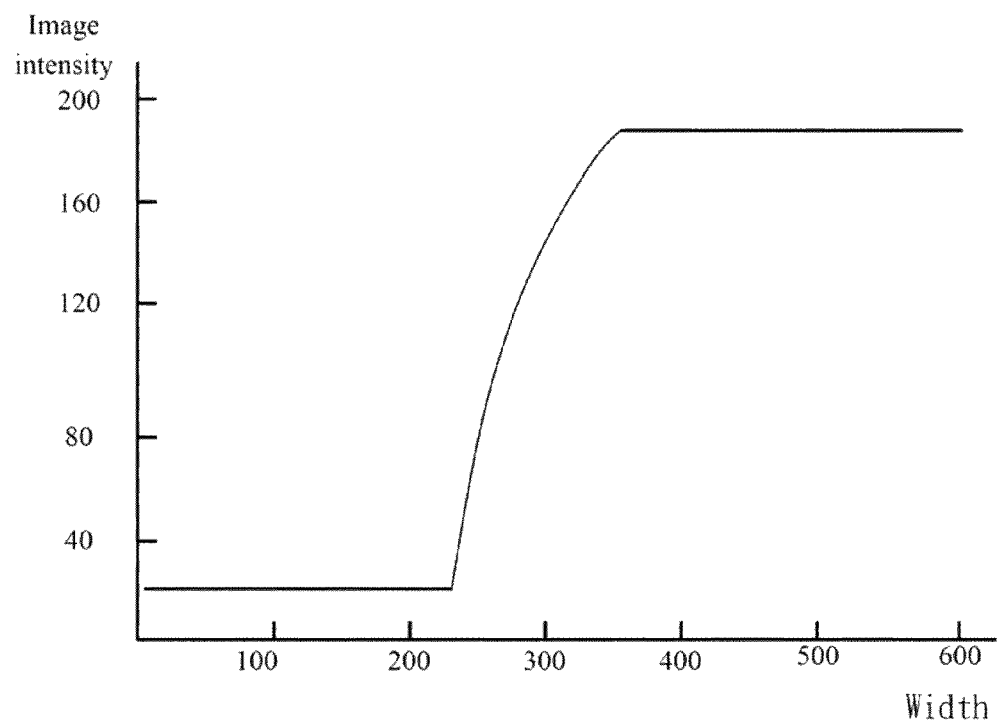
Figure 3:
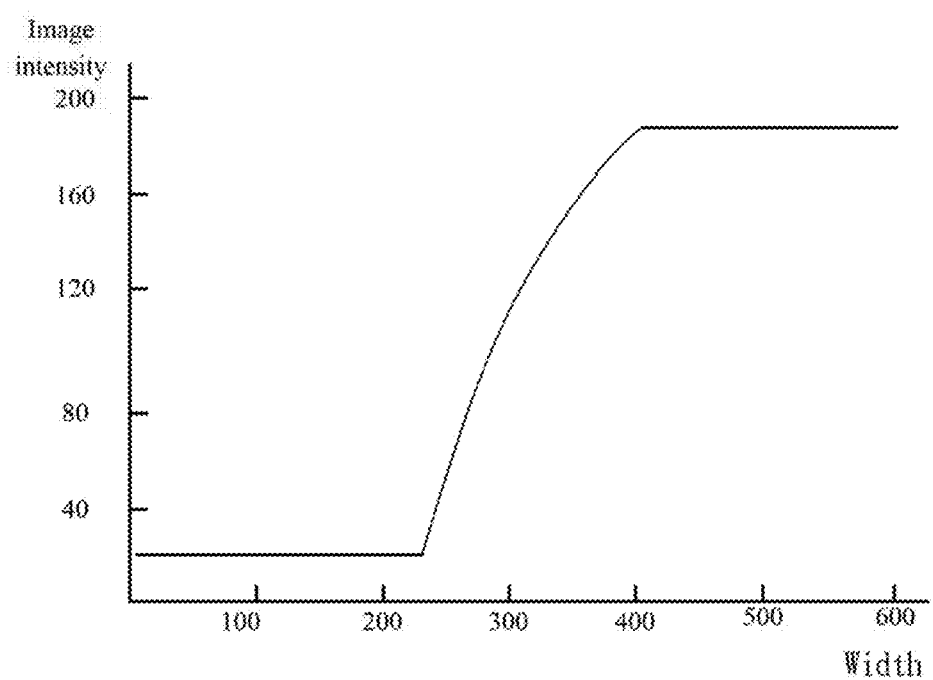

In order to highlight the difference in pixel intensity distribution, FIGS. 3A to 3C show the curves of pixel intensity distribution of a Gaussian synthesized image, an input image, and a synthesized blur image according to the present invention. As shown in the figures, the Gaussian synthesized image in FIG. 3A is linear, namely, approximating a straight line, on the edge of the image. Nonetheless, in compared with FIG. 3A, instead of being linear, the edge of the practical input image in FIG. 3B is a curve. The synthesized image exhibits a curve on its edge, as shown in FIG. 3C. Thereby, the curve on the edge of the synthesized blur image according to the present invention approximates that of the input image.

Besides, according to the present invention, in order to make the pixel intensity distribution further approximate that of the input image, a ratio factor can be further added to Equation (2) described above. The ratio factor is expressed in Equation (3) as follows:

$$s(x, y) = \alpha(f(x, y) - \min_{(x,y) \in K} f(x, y)) \quad (3)$$

$$\text{where } \alpha = \frac{s_{max} - s_{min}}{\max_{(x,y) \in K} f(x,y) - \min_{(x,y) \in K} f(x,y)} \quad (4)$$

Thereby, Equation (2) can be rewritten as Equation (5) below for clearly defining the PSF:

$$h(x, y)' = \begin{cases} \dfrac{s(x, y)}{\iint s(x, y) dx dy}, & x^2 + y^2 \leq \rho^2 \\ 0, & x^2 + y^2 > \rho^2 \end{cases} \quad (5)$$

In the step S30, the effective edge is selected according the input image and the synthesized blur image. In general, the image processing device uses an edge detecting method, for example, the Canny edge detection method and the Sobel edge detection method, for detecting the effective edge.

In the step S40, because the variance of the pixel intensity distribution is less obvious at high and low frequencies and more detailed at middle frequencies, adding noise variance at middle frequencies can highlight the variance in pixel intensity distribution. Thereby, Equation (1) is rewritten as Equation (6) below:

$$g(x,y) = f(x,y) * h(x,y) + n(0, \sigma^2) \quad (6)$$

where $n(0, \sigma^2)$ is a zero-mean Gaussian distribution curve function by rewriting the noise function $\xi(x,y)$ in Equation (1); and $\sigma$ is the standard deviation of the image intensities. For image matching, the variance of the synthesized blur image can be made to relate to the input image. Thereby, the standard deviation $\sigma$ is defined as $\sigma = \sigma(f(x,y))$ so that the noise intensity in the bright and dark portions will be lower than the noise intensity in the portion there between.

In the step S50, the process of pixel intensity distribution matching is performed on the input image after filtering in the step S40 and on the synthesized blur image and giving a blur degree parameter, which include mean values $\mu_1$, $\mu_2$ and variances $\sigma_1$, $\sigma_2$ having the relation as shown in Equation (7):

$$\sigma_i = \sigma_{max} - k(\mu_i - 128)^2, i=1,2 \quad (7)$$

In the step S60, according to Equation (7), the estimation for the blur degree B is expressed as Equation (8) below:

$$B = \int_{c_2}^{c_1} (hist_b(x) - hist_f(x)) dx \quad (8)$$

where $hist_b(x)$ is a pixel intensity distribution of the blur image, and $hist_f(x)$ is a pixel intensity distribution of the focused image. $c_1$ and $c_2$ indicate the upper and lower bounds of blur transition region. According to Equation (8), the minimum and maximum blur degrees are given, as shown in Equations (9) and (10), respectively, as follows:

$$B_{lb} = hist_b(\tilde{\mu}_1)(\tilde{\mu}_1 - c_1) + hist_b(\underline{\mu}_2)(c_2 - \underline{\mu}_2) \quad (9)$$

$$B_{ub} = B_{lb} + hist_b(\tilde{\mu}_1)(\tilde{\mu}_1 - \mu_1) + hist_b(\underline{\mu}_2)(\mu_2 - \underline{\mu}_2) \quad (10)$$

In addition, by eliminating the variables $c_1$ and $c_1$ in Equations (9) and (10), the initial value and the maximum estimated blur value of the defocused blur image are given in Equations (11) and (12):

$$\rho_{ini} = \frac{B_{lb}}{h} \quad (11)$$

$$\rho_{max} = \frac{B_{ub}}{h} \quad (12)$$

It is known from the above description that the estimation method for blur distribution according to the present invention can provide objective and close-to-requirement blur estimation for defocused blur image effectively. Thereby, the estimation method according to the present invention is convenient for users to know the realistic blur degree of an image. Moreover, for subsequent applications, more accurate blur estimation results are acquired. Thus, the performance in applications, such as evaluation of image quality and recovery of blur image, is enhanced.

Figure 4:
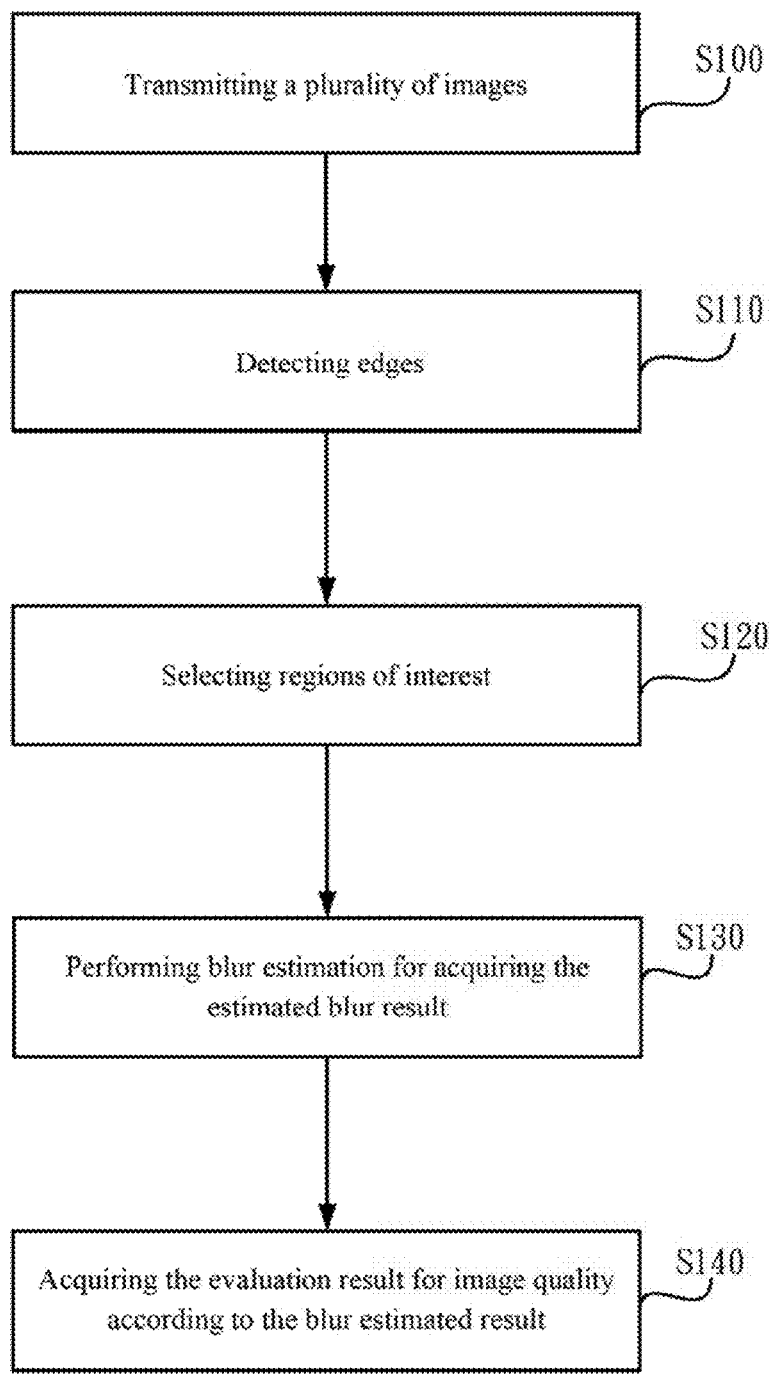
FIG. 4 shows a flowchart according to another embodiment of the present invention.

FIG. 4 shows a flowchart according to another embodiment of the present invention. As shown in the figure, the evaluation method for image quality according to the present invention adopts the approximation method of blur degree according to the previous embodiment for evaluating image quality. The evaluation method comprises steps of:

Step S100: Transmitting a plurality of images;
Step S110: Detecting edges;
Step S120: Selecting regions of interest;
Step S130: Performing blur estimation for acquiring the estimation result in blur; and
Step S140: Acquiring the evaluation result in image quality according to the estimation result in blur.

Figure 5:
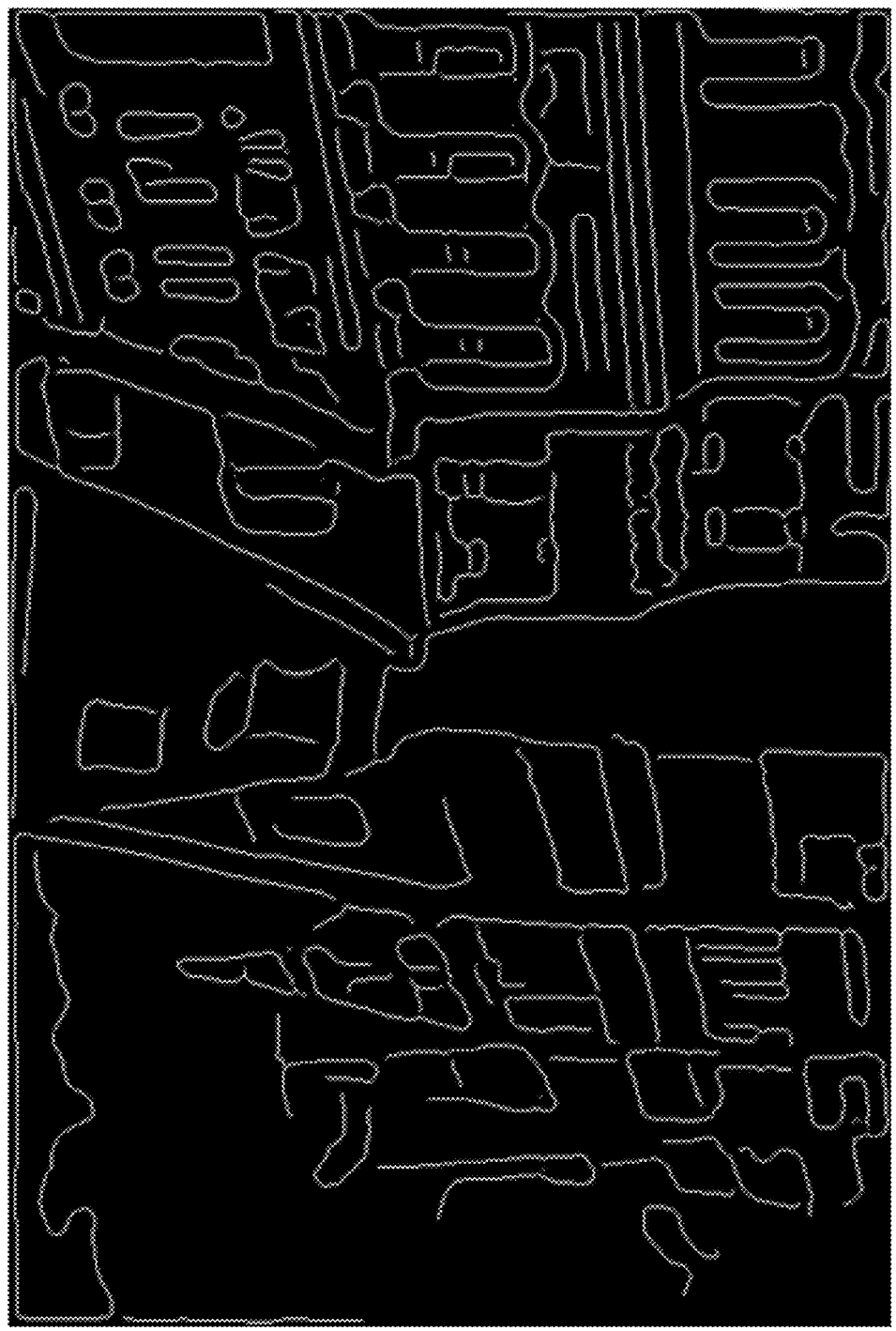
FIG. 5A shows a schematic diagram of edge detection according to another embodiment of the present invention.
FIG. 5B shows a schematic diagram of edge detection according to another embodiment of the present invention.
Figure 5:
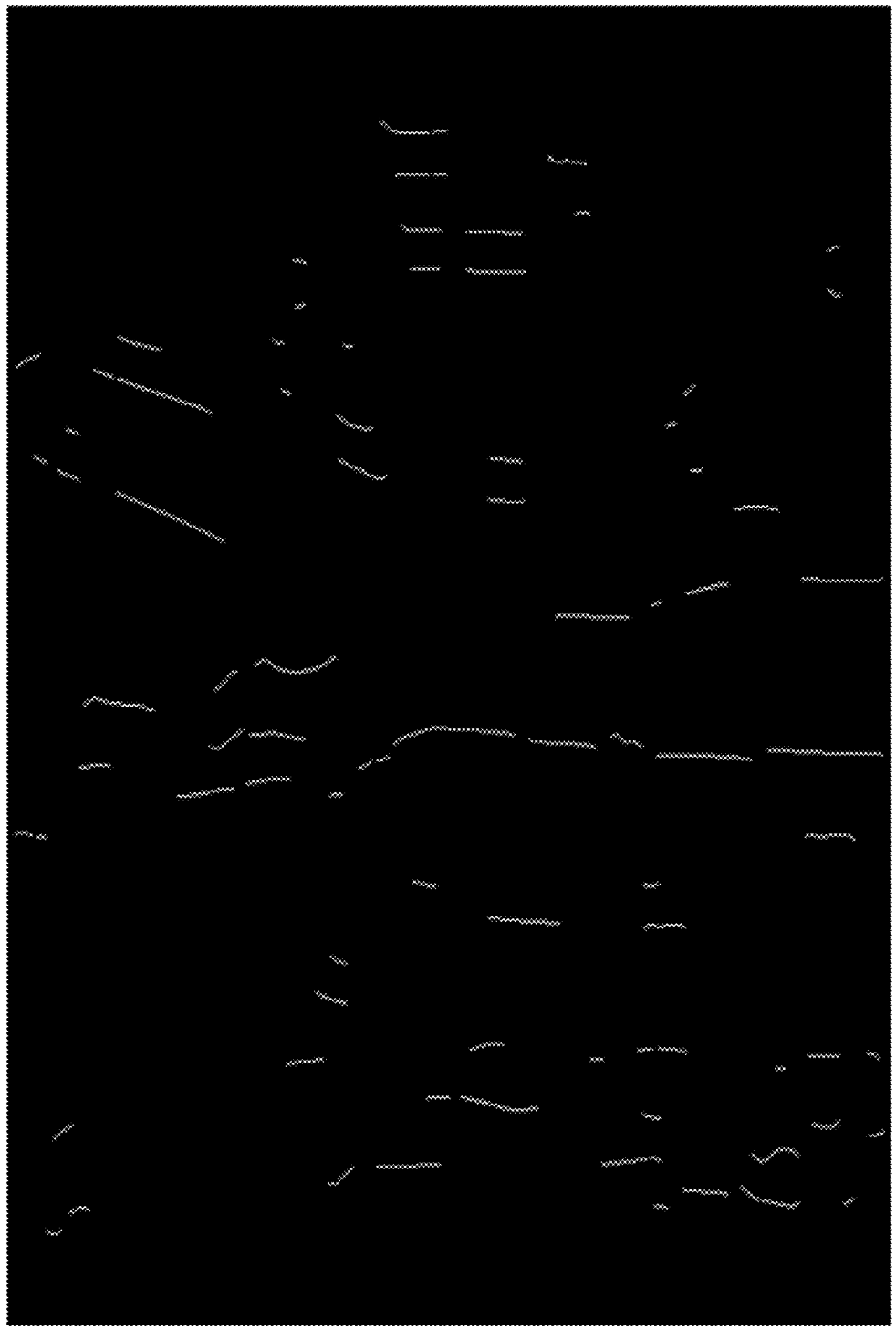

In the step S100, an image extracting device, such as a digital camera or a network monitor, or a storage device is used to transmit a plurality of input images to the image processing device. In the step S110, by mimicking human visual system, the ineffective edges of the plurality of input images are filtered. In other words, the effective edges of the plurality of input images are kept. For example, the Canny edge detection method is adopted to detect the edges of the plurality of input images and thus filtering the plurality of input images. Hence, the remaining edges of the plurality of input images are relatively fewer. Alternatively, the Sobel edge detection method is used to detect the edges of the G-color system in the three primary colors of the human visual system. As shown in FIGS. 5A and 5B, the edge detection according to the present embodiment detects the edges of the input images and gives the edge images in FIG. 5A. Then, according to the edge detection criteria, the ineffective edges that are hard to calculate are filtered and thus giving the edge detection result shown in FIG. 5B. In the step S120, according to the edge detection result, the region of interest (ROI) is selected. The selecting method according to the present embodiment adopts the standard deviation $\sigma$ as a selecting threshold value. By keeping the standard deviation $\sigma$ of the selected image greater or equal to the selecting threshold value, the region of interest is selected for subsequent blur estimation.

In the step S130, by adopting the estimation method for blur according to the previous embodiment, blur estimation is performed on the selecting result in the step S120 and giving the estimation result in blur of the plurality of input images. Because the method for blur estimation is described in the previous embodiment, the details will not be described again in the present embodiment. In the step S140, according to the estimation result in the step S130, the evaluation for image quality is performed. The criteria for the evaluation of image quality can be the minimum and maximum blur degree according to the previous embodiment. Alternatively, they can be the initial and maximum estimated values. Thereby, the evaluation result is acquired.

It is known from the above that users need not to judge if the image quality is too bad manually right after each image extraction. By using the evaluation method according to the present invention, the image quality can be evaluated. Then whether to re-extract the image or sort images according to image quality can be determined afterwards.

To sum up, the estimation method for image blur according to the present invention provides a closer synthesized blur image of a defocused blur image for matching pixel intensity distribution and giving an estimation result in blur closer to the input image for subsequent applications. In addition, the evaluation method for image quality according to the present invention is an application of the estimation method for image blur degree for evaluating image quality. Thereby, a more convenient image processing technology is provided. Users can reduce manual judgment on image quality or blur degree. Besides, users can know the blur degree and image quality of a defocused blur image rapidly. Hence, the accompanying software can get more accurate estimation results for blur degree.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature or spirit described in the claims of the present invention are included in the appended claims of the present invention.

The invention claimed is:

1. An evaluation method for image quality, comprising steps of:

transmitting a first input image and a second input image to an image processing device;

acquiring a first edge image and a second edge image according to a plurality of pixel intensity distribution parameters of said first input image and said second input image;

selecting a plurality of regions of interest according to said first edge image and said second edge image;

said image processing device producing a first synthesized image and a second synthesized image correspondingly according to said plurality of regions of interest;

said image processing device comparing said plurality of regions of interest of said first input image and said second input image, respectively, according to said first synthesized image and said second synthesized image for estimating blur distribution and giving a first blur degree parameter and a second blur degree parameter of said first input image and said second input image; and comparing said first blur degree parameter and second blur degree parameter for evaluating the image quality of said first input image and said second input image.

2. The evaluation method of claim 1, wherein the standard deviation of a bright portion and the standard deviation of a dark portion of said plurality of regions of interest are less than a distribution threshold value.

3. The evaluation method of claim 1, wherein an image variance of the standard deviation of said plurality of regions of interest is greater than a variance threshold value.

4. The evaluation method of claim 1, wherein an image standard deviation of said plurality of regions of interest is greater than or equal to an image standard threshold value.

* * * * *